Aug. 21, 1951     F. W. ALLAN     2,565,337
MOUNTING MECHANISM FOR BULLDOZER
BLADES AND SIMILAR IMPLEMENTS
Filed March 18, 1948     4 Sheets-Sheet 1
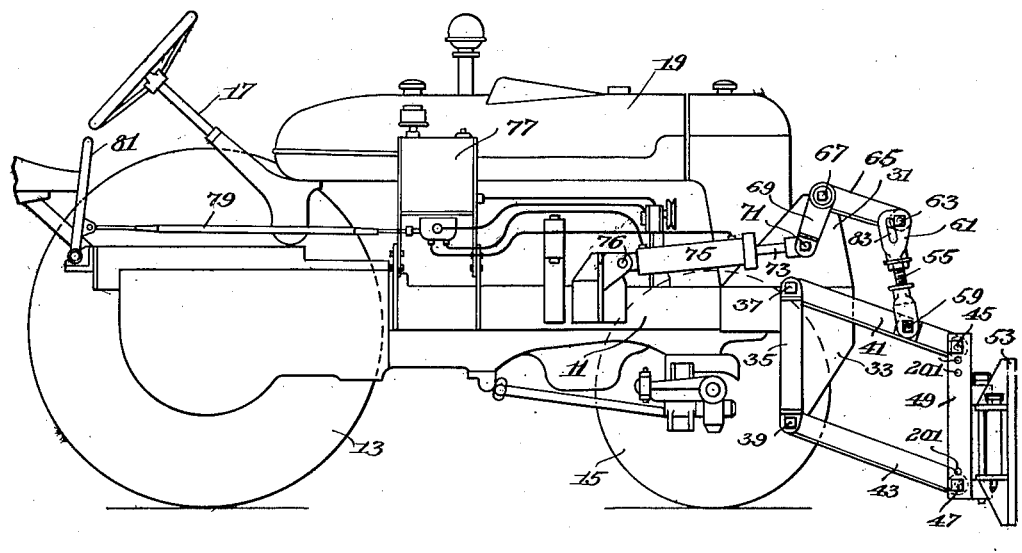
INVENTOR.
Frederick W. Allan
BY Charles Shepard
his Attorney Aug. 21, 1951  F. W. ALLAN  2,565,337
MOUNTING MECHANISM FOR BULLDOZER
BLADES AND SIMILAR IMPLEMENTS
Filed March 18, 1948  4 Sheets-Sheet 2
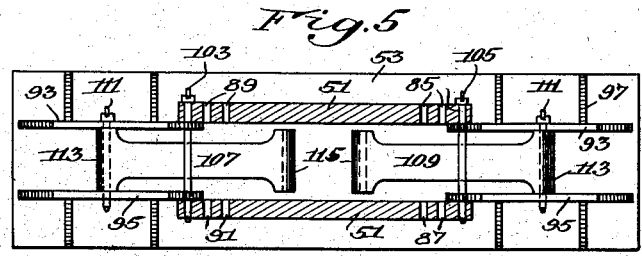
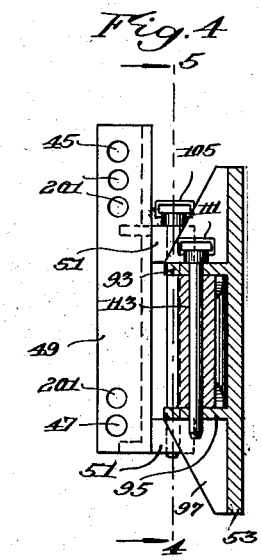
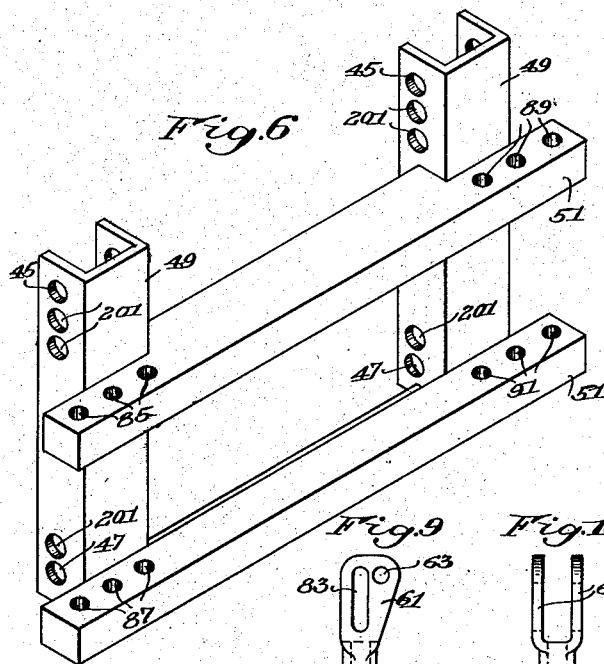
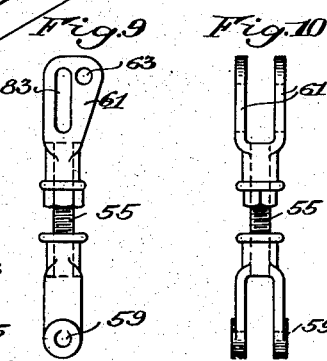
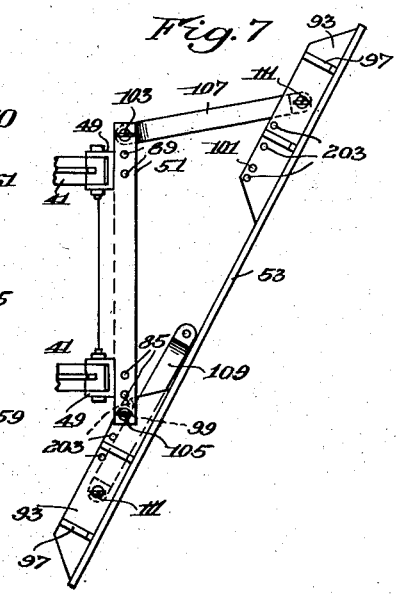
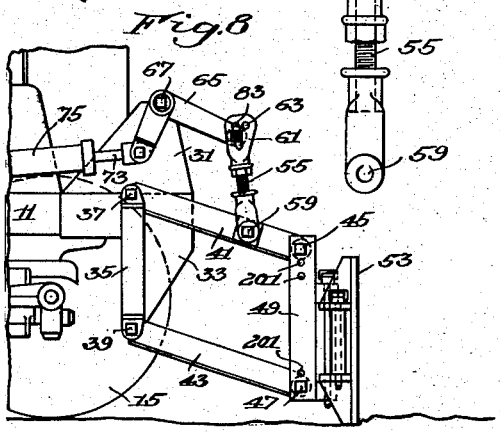
INVENTOR.
Frederick W. Allan
BY Charles Shepard
his Attorney

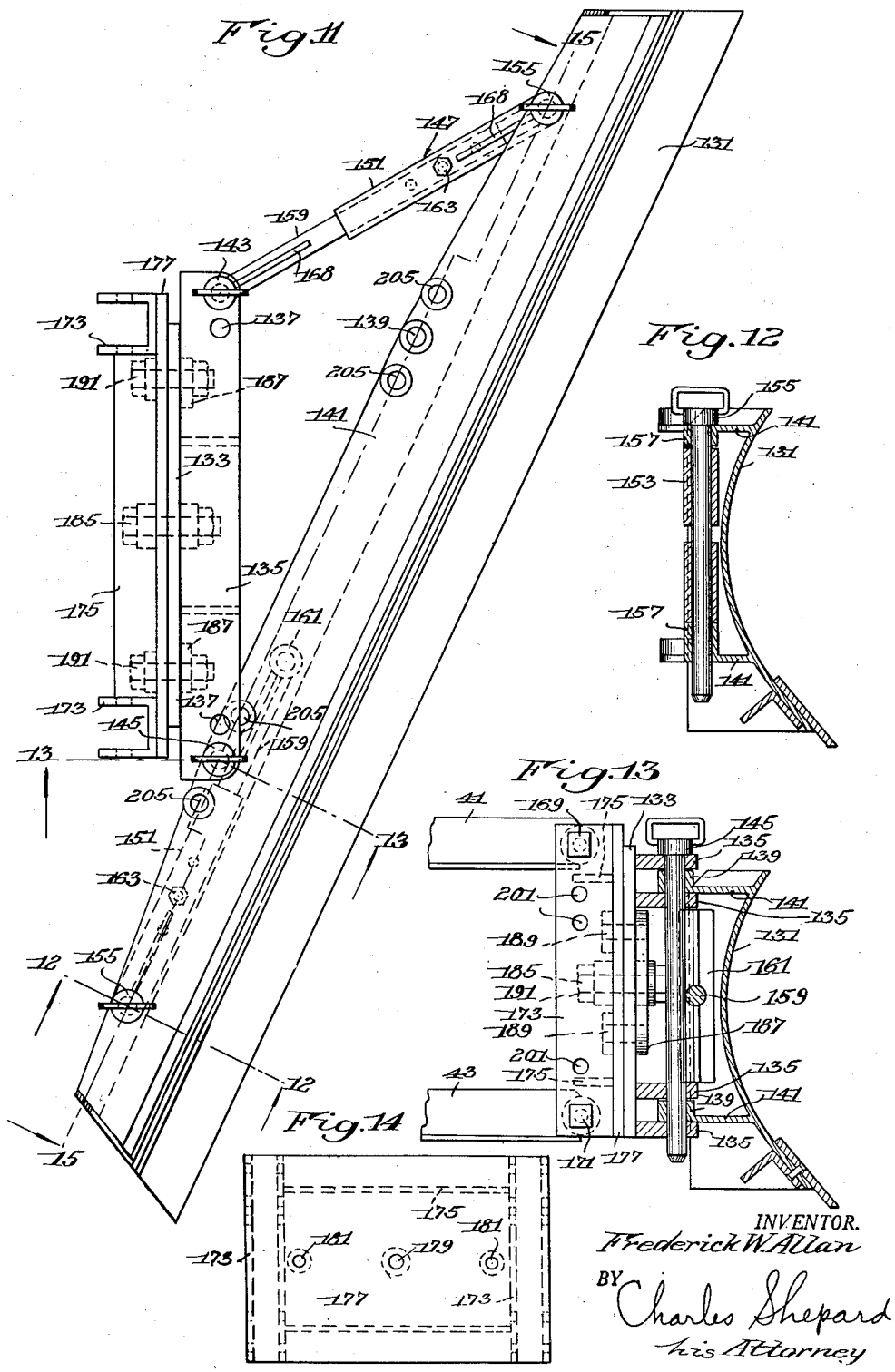

Aug. 21, 1951 — F. W. ALLAN — 2,565,337
MOUNTING MECHANISM FOR BULLDOZER BLADES AND SIMILAR IMPLEMENTS
Filed March 18, 1948 — 4 Sheets-Sheet 4
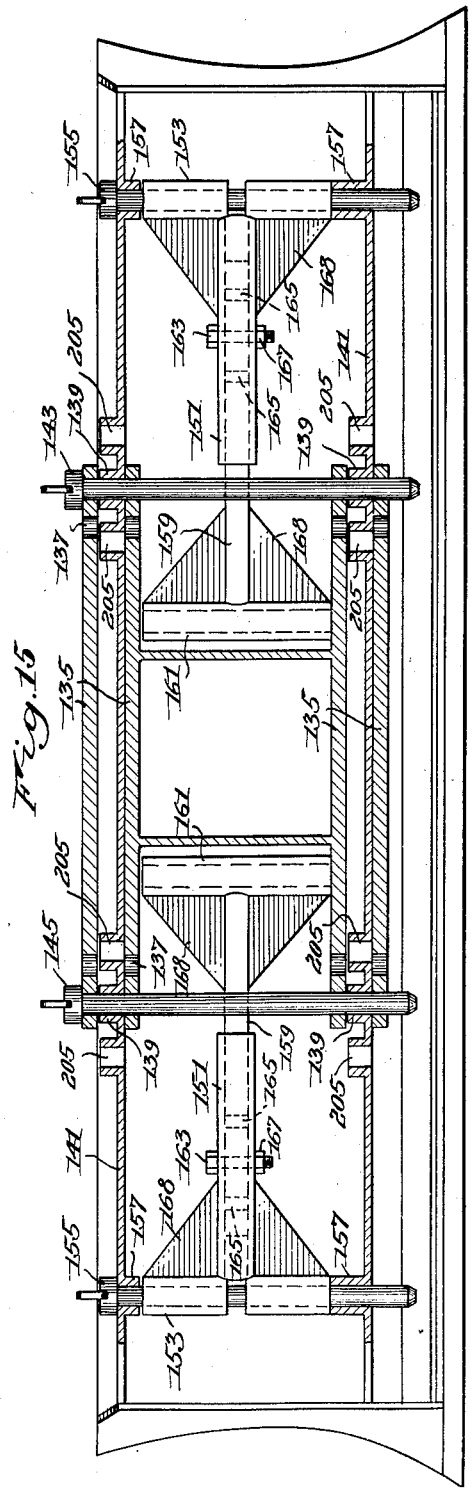
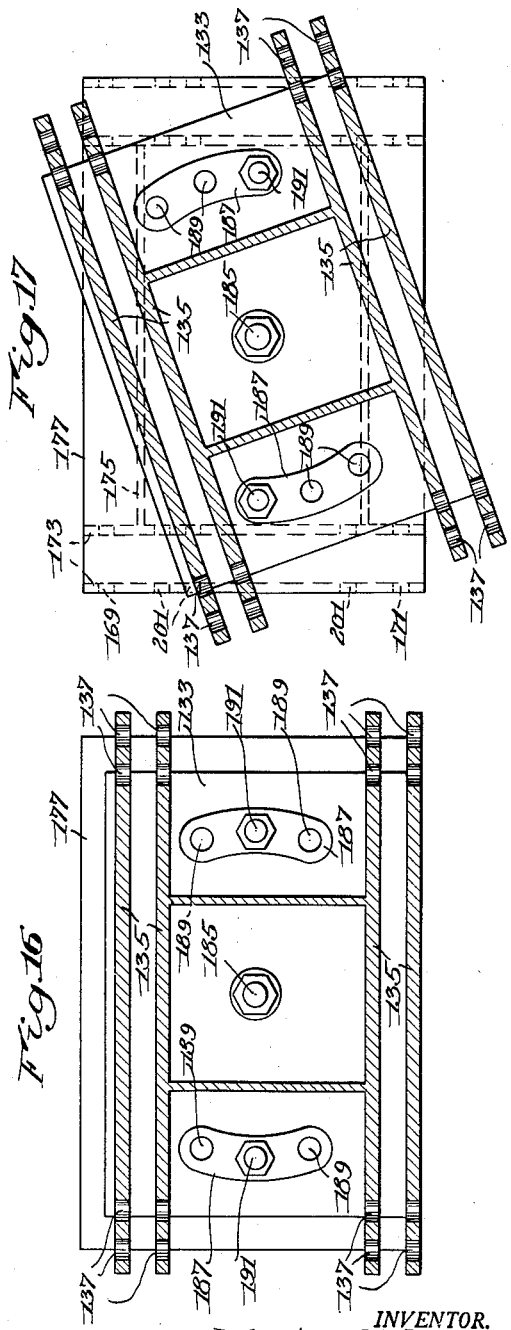
INVENTOR.
Frederick W. Allan
BY Charles Shepard
his Attorney Patented Aug. 21, 1951

2,565,337

UNITED STATES PATENT OFFICE 2,565,337

MOUNTING MECHANISM FOR BULLDOZER BLADES AND SIMILAR IMPLEMENTS

Frederick W. Allan, Batavia, N. Y.

Application March 18, 1948, Serial No. 15,638

1 Claim. (Cl. 37—144)

The present invention relates to work vehicles and more particularly to bulldozing and like equipment therefor, and it has for its general object to provide a relatively light but strong and simply and conveniently controlled pushing gear for blades and other ground working implements.

Another object is the provision of pushing gear so designed that it may be readily attached to existing tractors or similar vehicles, and which may be detached therefrom to reconvert the vehicle to other duties such as hauling and dragging.

A further object is the provision of mounting mechanism by which the pushing implement is so simply and widely adjustable in multiple planes and angularities that all probable conditions of surface to be worked upon can be met and dispositions of materials thereon can be effectively handled.

These and other desirable objects are accomplished by the construction disclosed as an illustrative embodiment of the invention in the following description and in the accompanying drawings forming a part hereof, in which:

Fig. 1 is a side elevation of a power tractor unit constructed, arranged, and equipped in accordance with and illustrating one embodiment of the invention;

Fig. 2 is an enlarged fragmentary top plan view of the forward portion thereof;

Fig. 3 is a fragmentary top plan view of the pushing or grading blade featured in Fig. 2 but in another position of angular adjustment in a horizontal plane, the angle being laterally transverse to the direction of movement of the vehicle;

Fig. 4 is an enlarged detail view of the blade in vertical cross section on the line 4—4 of Fig. 2 together with its immediate support which appears in side elevation;

Fig. 5 is a vertical section on the line 5—5 of Fig. 4 viewing the blade from the rear.

Fig. 6 is an enlarged perspective view of the mounting frame for the blade;

Fig. 7 is a top plan view similar to Fig. 3 but with the angle of the blade reversed to urge dislodged surface work material to the right instead of the left of the vehicle;

Fig. 8 is a fragmentary side elevation of the forward portion of the tractor blade and blade support on the scale of and corresponding substantially to the showing of Fig. 2, the blade being shown in work to illustrate one improved adjusting means therefor constituting a feature of the present invention;

Fig. 9 is an enlarged detail side elevation of a supporting link useful in obtaining a certain floating motion of the blade;

Fig. 10 is a corresponding front elevation of this link of Fig. 9;

Fig. 11 is an enlarged top plan view of a modified form of blade and its immediate supporting connection illustrating another form of lateral adjusting means as well as novel arrangements for tilting the blade vertically with reference to a horizontal ground line constituting another feature of this invention;

Fig. 12 is a vertical section taken substantially on the line 12—12 of Fig. 11;

Fig. 13 is a vertical section taken substantially on the line 13—13 of Fig. 11;

Fig. 14 is a reduced front view of the supporting plate for the mounting plate of the blade mechanism of Fig. 11;

Fig. 15 is a view of the mechanism shown in Fig. 11, partly in rear elevation and partly in vertical section substantially on the line 15—15 of Fig. 11;

Fig. 16 is a vertical sectional view of the mounting plate of Fig. 11 taken in the same plane as that of Fig. 15 but the portion in elevation being viewed from the front;

Fig. 17 is a similar view with the mounting plate differently adjusted to tilt the blade; and Fig. 18 is a diagrammatic side elevation of an alternative form of hydraulic lift mechanism for the parallelogram links on which the bulldozer blade or other implement is mounted.

The same reference numerals throughout the several views indicate the same parts.

This application is a continuation in part of my copending patent application, Serial No. 662,301, filed April 15, 1946, to which reference is made for a more detailed description of some of the features disclosed in the present application.

Certain subject matter disclosed but not claimed in this present application is claimed in said copending application.

Referring now more particularly to the drawings, there is shown a road vehicle in the form of the familiar wheel type tractor, the chassis of which comprises a frame 11, rear driving wheels 13, front steering wheels 15, and steering gear 17. The motive power unit is indicated generally at 19, representing the casing of an enclosed engine.

Rigidly secured to the front end of the tractor, as for example by means of gusset plates 31 and 33 riveted or bolted to the front ends of the main frame members 11, are a pair of vertical posts 35, conveniently in the form of channel members or angle bars, laterally spaced from each other on opposite sides of the center line of the vehicle. At the top and bottom of each post 35 are pivots 37 and 39, respectively, to which are pivoted the rear ends of upper and lower arms 41 and 43, respectively, made of angle bars or channel sections. The forward ends of these arms are pivoted at 45 and 47 to a mounting frame shown in detail in Fig. 6 as embodying channel iron uprights 49 at the sides and rear and intermediate top and bottom cross bars 51. On these cross bars are mounted the bulldozer blade 53 of Figs. 1 to 4 and 7 to 8 which is substantially vertically disposed and extends transversely of the chassis and its path of travel or other suitable pushable ground or surface working implement.

As seen in Fig. 1, the upper parallel arms 41 are each suspended by and from one of a pair of identical links 55, the lower heads 57 of which are pivoted to the respective forward portions of these arms 41 at 59. The links are of the turnbuckle type, as shown, to be lengthened or shortened for finer adjustments, and the upper heads 61 thereof are respectively pivoted at 63 to the forward arms of a pair of bellcrank levers 65 on a common transverse shaft 67 journaled in the gusset plates 31. Downwardly extending arms 69 on the shaft 67 are pivoted at 71 to the respective piston rods 73 of a pair of hydraulic cylinders 75, one at each side of the chassis, the rear end of each cylinder being pivoted at 76 to a chassis bracket. A pressure unit indicated only generally at 77 served by a power take-off from the vehicle engine and controlled through a draw rod 79 connected to a hand lever 81 adjacent to the steering control 17, exerts differential pressure on opposite faces of the pistons of rods 73 or maintains them in balance in identical manner, all as fully explained in said copending patent application. As a consequence, operation of the hydraulic cylinders 75 produces up and down motions of the arms 41 in the parallelogram of motion shared by the lower arms 43 and the mounting frame 49—51, and raises and lowers the blade 53 into and out of the dirt or other material or work to be operated upon, though maintaining its erect position.

It is sometimes desirable to allow the bulldozer blade or other implement to "float" or make minor upward and downward movements of its own accord, without operating the hydraulic cylinders 75. This is useful, for instance, when the bulldozer blade 53 is utilized to remove snow, surface sand, or light debris from a paved or hard surface, and in grading. As a feature of this invention, there is provision for allowing the blade and its immediate connections to ride easily and slightly yieldable over the work surface so that, with limitations, it may hold thereto merely by gravitational force. To this end, in the present embodiment, the head 61 of each link 55 is broadened and provided, adjacent to its pivot opening 63, with an elongated bearing or slot 83 as best shown in Fig. 9, to which slot the pivot pin may be transferred for this self-adjustment or floating action of the blade, as seen in Fig. 8. As a result, a lost motion connection is established between the links 41 and their bellcrank arms 65 so that the blade or implement may have, to an extent limited by the length of the slot 83, the floating action above described, but still may be positively lowered or positively raised by operating the hydraulic cylinders to an appropriate extent. When no floating action is desired, the pivot pin is, of course, placed in the hole 63 instead of the slot 83.

Another of the important features of this invention is the manner in which the ground working implement 53 is mounted for angular adjustment on its mounting frame 49—51. Referring still to Figs. 1 to 8, the upper and lower cross pieces 51 of the frame are both provided with series of equidistant alined round holes constituting sockets 85 and 87 at the right ends of the pieces 51, and 89 and 91 at the left ends thereof. The rear face of the blade or implement 53 is provided with upper and lower flanges 93 and 95 reinforced by webs 97. The respective flanges are pierced at 99 and 101 to provide corresponding sockets so spaced as to be alined selectively with pairs of alined sockets in the series 85—87 on the one hand and 89—91 on the other, with the lower flanges 95 resting on the lower cross piece 51 of the frame and the upper flanges 93 snugly below the upper cross piece 51, as appears in Figs. 4 and 5. When so assembled, coupling pins 103 and 105 are dropped into the alined sockets and the blade or implement 53 is directly and rigidly attached to the mounting frame 49—51 for direct flatwise pushing as clearly shown in Fig. 2. It may be readily detached and a suitably fitted implement of another kind substituted when desired.

At times and for special work, it is more effective and desirable to impart different degrees of still horizontal angularity to the bulldozer blade 53 or substitute implement so that the working face thereof, as in Fig. 3, while still upright, will cause loose surface material to be dislodged by its scraping edge and to be urged laterally of the road or direction of travel. This is particularly convenient when backfilling a trench.

To effect this change of function, two links 107 and 109 (Figs. 3, 4, 5, and 7) are pivotally mounted between the flanges 93 and 95 on coupling pins 111 at opposite sides of the blade center to fold inoperatively toward each other and against the rear of the blade during the above described non-angular direct mounting of the blade in Figs. 1 and 2. The links have elongated hub bearings 113 to end thrust against the flanges 93 and 95 and receive the pins 111. At their other ends, similar socket hubs 115 are provided. These may be swung rearwardly between the cross pieces 51 of the mounting frame to respectively aline with any selected pairs of the socket openings 85—87 or 89—91 and receive the coupling pins 103 and 105 locking them to the mounting frame. Either link, when not swung rearwardly for this purpose, lies forwardly of the pins 103 or 105 and is held thereby substantially in contact with the rear face of the plate 53, as seen in Figs. 2 and 5.

Thus, in Fig. 3 link 107 remains folded with coupling pin 103 directly connecting the blade 53 near its left end to the mounting frame 51, as before, but the right end of the ground blade has been advanced forwardly after disengaging coupling pin 105 and the latter has been reinserted in the same socket 85—87 of the mounting frame and the end hub socket 115 of link 109. The latter thereby becomes a rigid brace at the rear maintaining the blade at the desired angle as shown in the said figure and the worked material is deflected to the left of the vehicle as it advances.

Reverse manipulations of the brace links reverse the angle of the blade as shown in Fig. 7 and the worked ground material is urged to the right of the vehicle. Of course all or any of the series of sockets in the mounting frame are used in this way to vary the angles of Figs. 3 and 7 and with great facility entailing merely the withdrawal of the coupling pins and their reinsertion in other sockets, but in any event the pushable blade is ultimately held rigidly to the mounting plate by either direct connection or by the rigid bracing of one of the back links 107—109.

In Figs. 11 to 17 there are shown modifications of the above described embodiment of the invention and additions thereto that constitute features of novelty to be claimed herein. Referring now to these figures, the ground working implement 131 here shown is curved in vertical cross-section, but could be straight like the implement 53, if desired. There is provided a mounting frame 133 having forwardly extending flanges 135 arranged in two pairs, one near the top and one near the bottom of the frame 133, as seen in Figs. 13, 15, and 16. These flanges are provided near their ends with sockets 137 for the direct attachment of the blade 131 by means of alinable sockets 139 formed in apertured bosses on the flanges 141 on the rear face of the blade. The upper flange 141 on the blade 131 has apertured bosses which fit loosely between the two flanges 135 of the upper pair, and the lower flange 141 has similar apertured bosses which fit loosely between the two flanges 135 of the lower pair, as seen in Figs. 13 and 15. Coupling pins 143 and 145 are inserted through the apertures or sockets 137 and 139 to mount the blade 131 in straight position on the frame 133, when such position is desired.

If it is desired to mount the blade in an angular position, this may be done by using link braces 107 and 109 of the same kind shown in Figs. 3, 5, and 7, or by using a modified form of link brace now to be described. As best shown in Figs. 11 and 15, there are two links of this modified form, both indicated generally at 147 (one in dotted lines in the former figure). Each has an outer or forward tubular section 151 provided with a hub 153 receiving coupling pins 155 thrust through pivot sockets 157 in blade flanges 141. This tubular section receives, telescopically, an extension rod 159 terminating in a socket hub 161 adapted to be alined with any selected one of the mounting frame sockets 137 and receive a coupling pin 143 as in Fig. 11. The length of the brace link, in each case, may be altered by removing and replacing a bolt 163 extending transversely through the outer tubular element 151 and through any selected one of a plurality of transverse holes 165 in the inner rod 159. The nut 167 on each bolt may be tightened to hold the bolt against accidental dislodgement and thus to preserve the desired measure of over-all length of the brace. As before, the link braces fold, when not in use, against the rear of the ground working implement and are held in this position by the pins 143 or 145, or one of the link braces may be swung outwardly and rearwardly as in Fig. 11 to have the coupling pin 143 inserted through its hub 161 and brace the implement in an angular position for lateral diverting action on the worked material.

The relatively long hubs at the ends of the braces 151, 159 are rigidly held to the brace links by gusset plates 168 welded both to the hubs and to the brace links. The hubs, it will be noted from Fig. 15, are quite long, substantially the full length of the free space between the flanges (or between the bosses on the flanges) with which they cooperate, so that the hubs not only have a good bearing on the pins, but also are adequately supported from the flange 135 and serve to support the upper flange 141 when the blade is in angular position.

In Figs. 11 to 15 there is also illustrated another feature of this invention having to do with the mounting of either type of blade or either type of adjusting and bracing means or, in fact, other types of implements upon a pushing vehicle, and it provides still another angular adjustment of such a pushable implement. That is one in which the ground edge, whether horizontally straight across the direction of travel as in Figs. 1 and 2 or angular thereto as in Figs. 3, 7, and 11, may also be tilted upwardly edgewise at an angle to the ground line to fit certain conditions of terrain or for special jobs such as crowning a roadway. To these ends, the elevating arms 41 and 43 (Figs. 13 and 14) are pivoted at 169 and 171 as before to a supporting frame much like the mounting frame of Fig. 6, having upright channel members 173 to take the pivots at top and bottom, and connecting cross pieces 175. However, its front consists of a vertically disposed face plate 177 having a central aperture and bearing 179 and an aperture 181 at each side thereof.

The mounting frame 133 of this modification (see now Figs 11, 13, 16, and 17) has a flat or plane rear face closely contacting with and rotatable against the front face of the supporting face plate 177, being pivoted thereto on a center bolt 185 passing through both and having a bearing in the central aperture 179 of the plate 177. Thus, the whole immediate supporting structure of the blade 131 previously described, including the adjusting links 151, 159, etc., may be tilted in the vertical plane of the face plate 177 to any angle desired. As a means of securing several of these positions of adjustment, segmental reinforcements 187 (Figs. 16 and 17) on the front face of frame plate 133 at either side of the center bolt 185 are pierced by concentric groups of bolt holes 189 that may, as to each group, be selectively alined with one of the apertures 181 (Fig. 14) of the face plate 177, and bolts 191 may be passed therethrough and tightened. In Fig. 16 the bolts are in the center holes of each group so that they make a line with the center pivot bolt 185, establishing the normal level position of the bottom edge of the blade 131 whether that is angled horizontally or not. In Fig. 17, the top hole of the left hand group and the bottom hole of the right hand one (viewed from the front) is utilized, so that the left end of the working blade (as viewed from the rear or from the vehicle driver's seat) is titled high and the working edge sloped downwardly to the right side of the road. In any case the structure forwardly of and supported from the pivots 169 and 171 is solid and rigid during operation, and all of such structure may be moved as a unit upwardly or downwardly, as desired, by operating the hydraulic cylinders 75, without in any way altering or interfering with the horizontal or vertical angular adjustment or setting of the blade.

When the blade is both vertically and horizontally angled, it is particularly useful, for example, in forming a shallow V-shaped ditch or trench, the laterally-projecting lower end of the blade engaging the ground for this purpose while the tractor itself runs over the level ground to one side of the ditch being formed. With an angularly adjustable blade of this kind the mounting on the parallelogram links 41, 43 is particularly advantageous, because it enables the elevation of the blade to be altered without changing either the vertical angularity or the horizontal angularity of the blade relatively to the chassis of the tractor. But if it is desired, under special circumstances, that the angularity should be changed as the blade is raised or lowered, then the parallelogram mounting linkage may be thrown out of its strictly parallelogram relationship by pivoting the front ends of the upper links 41, or the lower links 43, or both, in alternate holes 201 (Figs. 1, 4, 6, 8, and 13) in place of the regular holes which produce parallelism of the links 41 and 43. The result will be that the blade will tilt slightly as it is raised or lowered, instead of rising or going down through positions always strictly parallel to each other.

For the purpose of offsetting the blade in a lateral direction (or side-shifting it, as it is sometimes called), the blade is provided with extra or alternate holes or sockets 203 (Figs. 2, 3, and 7) any one of which may be used to receive the pins 103 or 105 or both, to mount the blade in an off-center or side-shifted position, whether it be placed straight or at an angle. Similarly, in the other form of construction (Figs. 11-17) extra holes may be provided for the same side-shifting purpose, as indicated at 205 in Figs. 11 and 15.

The blade raising and lowering mechanism as thus far described is powered by a pair of hydraulic cylinders 75 mounted on opposite sides of the tractor motor. This arrangement, however, is not the only one which may be used within the limits of the present invention. As an example of another power unit which may be used and which, in fact, offers certain advantages over the cylinders 75, there is shown diagrammatically in Fig. 18 an arrangement wherein the parallel (or approximately parallel) link arms 41 and 43 remain as before, but are powered by a single hydraulic cylinder mounted between the right and left pairs of links, instead of two cylinders at the sides of the tractor.

In this arrangement, a pair of gusset plates 211 firmly secured to the front of the tractor frame are mounted between the two lower links 43 and in laterally separated relation to each other. The lower end of a hydraulic cylinder 213 enters the space between these two gusset plates and is pivoted to them by the cross shaft 215 mounted in the gusset plates. A piston rod 217 projects from the upper end of the cylinder 213, and is pivoted at its upper end, on a shaft or stud 219, to a pair of laterally separated vertical links 221 which are pivoted at 223 and 225 to the push links 41 and 43, respectively, intermediate their ends. Thus increasing the fluid pressure in the lower end of the cylinder 213, below the piston therein (not shown) will tend to push the piston rod 217 upwardly to raise the vertical links 221 and thus to raise the push links 41 and 43 of the parallelogram, lifting the bulldozer blade or other implement mounted on the forward ends of those links 41 and 43. Similarly an increase in the fluid pressure above the piston in the cylinder 213, as compared with the pressure below, will tend to pull downwardly on the links 221 and lower the forward ends of the links 41 and 43 and anything mounted on them.

Bulldozer equipment provided in accordance with this invention when fitted to a tractor or similar road vehicle can be quickly adapted to a wide variety of jobs even on difficult terrain and under other unusual working conditions as well as with a variety of materials to be worked upon. Many of the present features are not limited to relatively light tractors as shown in Fig. 1 but are applicable also to the more ponderous types of pushing vehicles used in heavy bulldozing work.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claim.

What is claimed is:

A work blade element mounting for motor vehicles, said mounting comprising a cross frame extending transversely substantially straight across in front of the vehicle throughout a substantial part of the width of the vehicle and substantially perpendicular to the longitudinal center line of the vehicle, said cross frame having a rear section and a front section pivotally mounted on the rear section for rotation relative thereto about a pivotal axis arranged approximately horizontally in approximately a fore-and-aft direction, said front section being provided with a plurality of laterally spaced and approximately vertically extending pin sockets at each of its opposite ends, a work blade element of generally upstanding and transversely extending form located in front of said cross frame and including a plurality of rearwardly projecting portions having on each side of the center of said blade element a plurality of laterally spaced and approximately vertically extending pin sockets therein, and a strut having approximately vertically extending pin sockets at opposite ends, the various pin sockets being so arranged that a pin may be inserted through pin sockets of said blade element and of said cross frame at one end thereof to connect said blade element pivotally to one end of said cross frame, and so that one end of said strut may be pinned to said cross frame near the opposite end thereof and the opposite end of said strut may be pinned to said blade element at a point remote from the pivotal connection of the blade element to the first end of the cross frame, to maintain the blade at a horizontal angle to said cross frame.

FREDERICK W. ALLAN.

REFERENCES CITED

The following references are of record in the file of this patent:

UNITED STATES PATENTS

| Number | Name | Date |
|---|---|---|
| 1,788,698 | Wooldridge | Jan. 13, 1931 |
| 1,920,475 | Meyer | Aug. 1, 1933 |
| 1,961,011 | Pearson | May 29, 1934 |
| 1,967,379 | Stewart | July 24, 1934 |
| 2,029,122 | Stout | Jan. 28, 1936 |
| 2,059,431 | Barrett et al. | Nov. 3, 1936 |
| 2,084,690 | Knapp | June 22, 1937 |
| 2,107,123 | Low | Feb. 1, 1938 |
| 2,187,707 | Kane | Jan. 16, 1940 |
| 2,216,572 | Nichols | Oct. 1, 1940 |
| 2,224,725 | Felt | Dec. 10, 1940 |
| 2,308,535 | Paulsen | Jan. 19, 1943 |
| 2,311,553 | Le Tourneau | Feb. 16, 1943 |
| 2,396,407 | Austin | Mar. 12, 1946 |
| 2,404,759 | Washbond | July 23, 1946 |
| 2,404,760 | Washbond | July 23, 1946 |
| 2,408,268 | Peterson et al. | Sept. 24, 1946 |
| 2,446,136 | Jarmin | July 27, 1948 |
| 2,452,408 | Washbond | Oct. 26, 1948 |
| 2,452,774 | Le Tourneau | Nov. 2, 1948 |
| 2,502,681 | Swanson | Apr. 4, 1950 |